United States Patent
Furuwata et al.

(10) Patent No.: US 8,922,796 B2
(45) Date of Patent: Dec. 30, 2014

(54) PRINTING APPARATUS AND PRINTING METHOD WITH ERROR DETECTION

(75) Inventors: Yuichi Furuwata, Shiojiri (JP); Takayuki Furumoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 127 days.

(21) Appl. No.: 13/532,619

(22) Filed: Jun. 25, 2012

(65) Prior Publication Data

US 2012/0327448 A1     Dec. 27, 2012

(30) Foreign Application Priority Data

Jun. 27, 2011    (JP) ................................ 2011-141809

(51) Int. Cl.
| | |
|---|---|
| G06F 15/00 | (2006.01) |
| G06F 3/12 | (2006.01) |
| G06K 1/00 | (2006.01) |
| G06K 15/00 | (2006.01) |
| G06K 15/02 | (2006.01) |
| G03G 15/00 | (2006.01) |

(52) U.S. Cl.
CPC .............. *G06K 15/02* (2013.01); *G06K 15/408* (2013.01); *G06K 15/005* (2013.01); *G06K 15/1817* (2013.01); *G03G 15/00* (2013.01)
USPC ........................................ 358/1.13; 358/1.15

(58) Field of Classification Search
CPC ................ G06F 3/121; G06F 11/3055; G06K 2215/0085
USPC ......................................... 358/1.13, 1.15, 1.1
See application file for complete search history.

(56) References Cited

U.S. PATENT DOCUMENTS

| | | | |
|---|---|---|---|
| 6,996,346 B2 * | 2/2006 | Ito | .................................. 399/12 |
| 7,684,064 B2 * | 3/2010 | Kimura et al. | ............... 358/1.14 |
| 2012/0224224 A1 | 9/2012 | Furumoto et al. | |

FOREIGN PATENT DOCUMENTS

| | | |
|---|---|---|
| JP | 2006-184713 A | 7/2006 |
| JP | 2007-098590 A | 4/2007 |

\* cited by examiner

*Primary Examiner* — Douglas Tran
(74) *Attorney, Agent, or Firm* — Maschoff Brennan (57) ABSTRACT

A printing apparatus includes a printing unit that executes printing based on a print job, and a detector that detects occurrence and removal of an error in the printing apparatus. When removal of an error is detected, the printing unit continues a paused state of the print job paused by the error.

10 Claims, 4 Drawing Sheets

PRINTING APPARATUS AND PRINTING METHOD WITH ERROR DETECTION

BACKGROUND

1. Technical Field

The present invention relates to a printing apparatus and a printing method.

2. Related Art

There is a printing apparatus that accepts a predetermined key operation by a user during execution of a print job, for example, and pauses or cancels the print job upon acceptance of such a key operation.

JP-A-2006-184713 describes an image forming apparatus that pauses processing of a job when a tray sensor detects withdrawal of sheets on a tray by a user.

There is another printing apparatus that pauses a print job in execution when detecting occurrence of an error such as paper jamming or an out-of-paper state, and automatically resumes the paused print job when detecting removal of the error thereafter.

Some printing apparatuses have an interruption print capability. Upon acceptance of a predetermined key operation by a user, this printing apparatus pauses a print job in execution, and starts executing another print job when the another print job is selected and an instruction for interruption print thereof is accepted thereafter.

When an error occurs, the aforementioned printing apparatuses automatically resumes the paused print job after removal of the error. Even if a user performs a work of removing an error in such a printing apparatus (e.g., work of removing a jammed sheet), therefore, when the print job paused by the error is not the job of the user, the paused print job is automatically resumed. When the user wants to carry out interruption print of the user's own print job by priority, it is necessary to pause the resumed print job and perform an operation for interruption print.

In some cases, a user may suffer poor usability when a print job is automatically resumed after error removal. Particularly, it is not convenient for a user standing in front of a printing apparatus to remove an error if the printing result of the user's own print job cannot be obtained first.

SUMMARY

An advantage of some aspects of the invention is to improve the usability of interruption print of a print job when an error is removed.

To bring about the advantage, according to an aspect of the invention, there is provided a printing apparatus including a printing unit that executes printing based on a print job, and a detector that detects occurrence and removal of an error in the printing apparatus, whereby when removal of an error is detected, the printing unit continues a paused state of the print job paused by the error.

With removal of an error being detected, the printing unit may continue the paused state of the paused print job when there is another print job standing by for printing in addition to the print job paused, and may resume execution of the paused print job when there is not any print job standing by for printing.

The printing apparatus may further include an instruction unit that accepts an instruction from a user, wherein when removal of an error is detected, the printing unit may execute printing based on one of the paused print job, and the another print job standing by for printing which is selected by via the instruction unit.

The printing apparatus may further include a display unit that displays information on the paused print job, wherein when removal of an error is detected, the display unit may display information on the paused print job and information on the another print job standing by for printing on a pause screen in a switchable manner via the instruction unit, and accept selection of one of the print jobs.

The printing apparatus may further include a display unit that displays information on the paused print job, wherein when removal of an error is detected, the display unit may display a list of information on the paused print job and information on the another print job standing by for printing on a pause screen, and accept selection of one of the print jobs.

After removal of an error is detected, the printing unit may start measuring a first predetermined time, and when the first predetermined time elapses without an instruction from the user, the printing unit may resume execution of the paused print job.

When there is a predetermined instruction from the user before elapse of the first predetermined time, the printing unit may start measuring a second predetermined time longer than the first predetermined time, and when the second predetermined time elapses without an instruction from the user, the printing unit may resume execution of the paused print job.

The printing apparatus may further include a verification unit that verifies the user, wherein the printing unit may select one of the paused print job, and the another print job standing by for printing whose user is verified by the verification unit, and execute printing based on the selected print job.

To bring about the advantage, according to another aspect of the invention, there is provided a printing method for a printing apparatus, including executing printing based on a print job, and detecting occurrence and removal of an error in the printing apparatus, whereby when removal of an error is detected, a paused state of the print job paused by the error is continued in the execution of printing.

Other advantages, configurations and features of the invention may be appreciated from a review of the following detailed description of the embodiments.

BRIEF DESCRIPTION OF THE DRAWINGS

The invention will be described with reference to the accompanying drawings, wherein like numbers reference like elements.

DESCRIPTION OF EXEMPLARY EMBODIMENTS

An exemplary embodiment of the invention will be described below with reference to the accompanying drawings.

Figure 1:
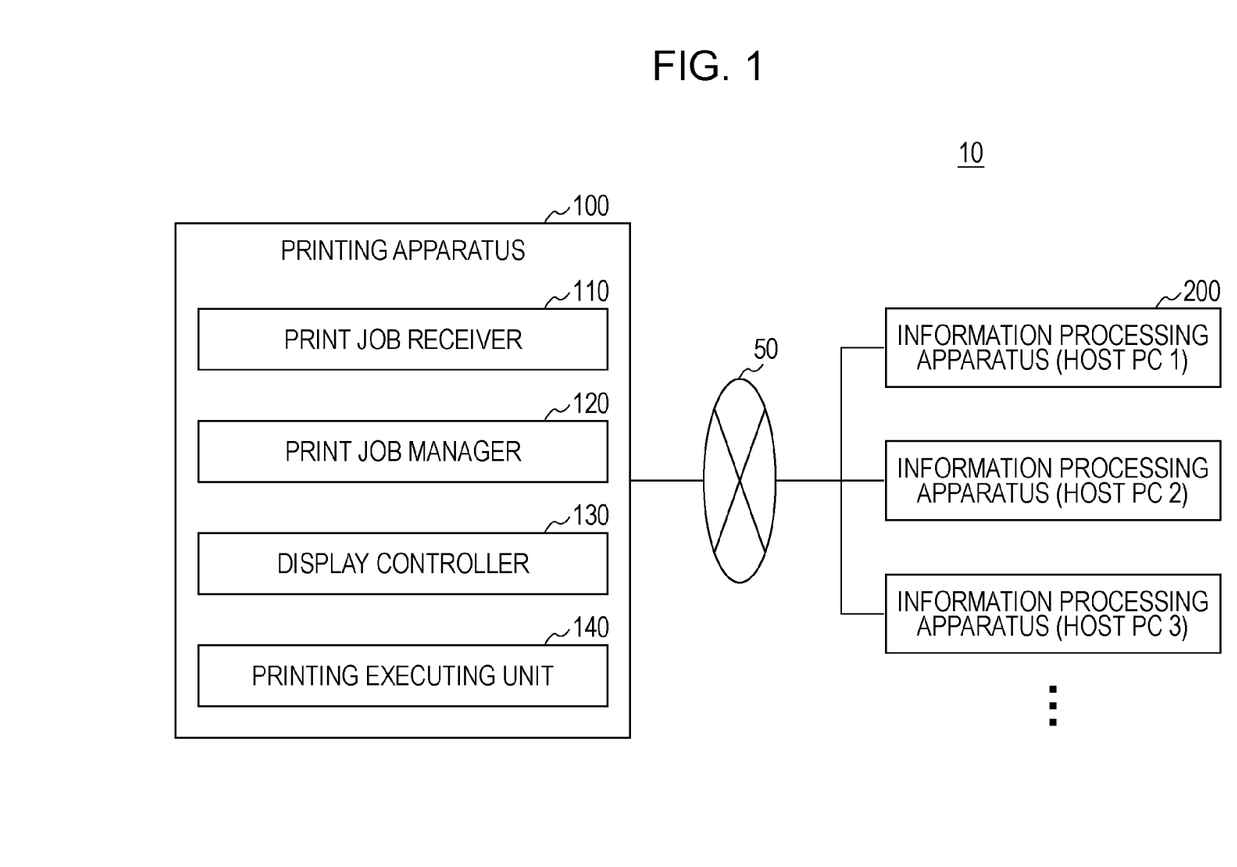
FIG. 1 is a block diagram showing one example of the schematic configuration of a printing system according to an exemplary embodiment of the invention.

FIG. 1 is a block diagram showing one example of the schematic configuration of a printing system 10 according to the exemplary embodiment of the invention.

The printing system 10 includes a printing apparatus 100, and an information processing apparatus (host PC (Personal Computer)) 200.

The printing apparatus 100 and the information processing apparatus 200 are connected together in an interactively communicatable manner over a computer network 50 such as LAN (Local Area Network).

The printing apparatus 100 prints print data (print job) transmitted from the information processing apparatus 200. The printing apparatus 100 is an ordinary printer including, for example, a CPU (Central Processing Unit), a main storage unit such as RAM (Random Access Memory), an auxiliary storage unit such as ROM (Read Only Memory) or flash memory, a communication unit that connects to the network 50, and a printing engine (none of the components shown). The printing apparatus 100 is an ink jet type or laser type printer, for example.

The printing apparatus 100 further has an operation panel (input/output unit) 121 including input buttons, and a liquid crystal display.

Figure 2:
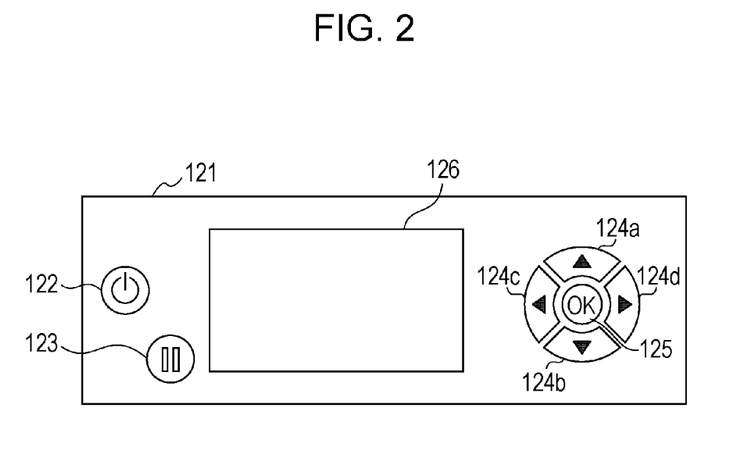
FIG. 2 is a diagram showing one example of an operation panel.

FIG. 2 is a diagram showing one example of the operation panel 121.

As illustrated, the operation panel 121 includes a power button 122, a pause button 123, directional keys (UP key 124a, DOWN key 124b, LEFT key 124c, RIGHT key 124d), an OK button 125, and a display 126.

The power button 122 is used to power up the printing apparatus 100. The pause button 123 is used to pause a print job in execution or cancel the pausing. The directional keys (124a to 124d) are used to change a screen displayed on the display 126 (e.g., scrolling information X on a print job). The OK button 125 is used to select a print job or select a highlighted item. The display 126 displays various kinds of information (e.g., information X on a print job).

As shown in FIG. 1, the printing apparatus 100 includes a print job receiver 110, a print job manager 120, a display controller 130, and a printing executing unit 140. The functional sections (110 to 140) can be achieved by, for example, loading a predetermined program stored in the auxiliary storage unit into the main storage unit and executing the program by means of the CPU.

The print job receiver 110 receives a print job transmitted from the information processing apparatus 200. The print job receiver 110 then stores the received print job into a predetermined storage unit.

The print job manager 120 manages a print job received by the print job receiver 110. For example, the print job manager 120 analyzes the print job received by the print job receiver 110, and generates information X on the print job (hereinafter also referred to simply as "information X"). The information X includes, for example, a print job name (or file name) to identify the print job, the name of an apparatus that has generated the print job (or user name), print setting (e.g., sheet size), and the number of prints.

The print job manager 120 also decides the execution order of the print job. Normally, the print job manager 120 directly treats the reception order of a print job as the execution order of the print job. When the execution order of the print job is changed by an instruction from a user (e.g., in case of interruption print), the execution order of the print job is changed according to the instruction.

The print job manager 120 deletes a print job which has undergone printing from the predetermined storage unit.

The display controller 130 controls a screen to be displayed on a predetermined output device (e.g., display 126). The display controller 130 controls an input from a predetermined input device (e.g., operation panel 121). For example, the display controller 130 displays information X generated by the print job manager 120 on the display 126. Further, the display controller 130 changes the screen according to, for example, the operation of various buttons or keys on the operation panel 121.

When there is a print job in execution, the display controller 130 displays information X on the print job in a first mode (whose details will be given later). When there is a paused print job, the display controller 130 displays information X on the print job in a second mode (whose details will be given later) different from the first mode. When one print job is selected, the display controller 130 displays information X on the print job in a third mode (whose details will be given later) different from the second mode.

When the printing executing unit 140 detects an error during execution of a print job, the display controller 130 displays an error screen (whose details will be given later) notifying the error.

When the display controller 130 is notified of removal of an error by the printing executing unit 140, the display controller 130 determines whether there is one print job or a plurality of print jobs to be managed by the print job manager 120 displays. When there is one print job, e.g., when there is not any print job standing by for printing and there is a paused print job, the display controller 130 displays a screen in the first mode.

When there are a plurality of print jobs, e.g., when there is a paused print job and there is at least one print job standing by for printing, the display controller 130 displays a screen in the second mode.

The printing executing unit 140 executes printing based on a print job. Specifically, the printing executing unit 140 extracts a print command and data to be printed from the print job transmitted from the information processing apparatus 200 to generate print data printable by the printing engine (not shown). Then, the printing executing unit 140 sends the print data to the printing engine, and controls the printing engine and a printing head (not shown) to execute printing on a print medium (e.g., printing sheet) based on the print job.

The printing executing unit 140 detects an error. For example, the printing executing unit 140 detects an error, such as paper jamming or an out-of-paper state, based on output signals from various sensors (not shown) provided in the printing engine or the printing apparatus 100. Upon detection of an error, the printing executing unit 140 notifies other functional sections of the error. Upon detection of removal of an error, the printing executing unit 140 also notifies the other functional sections of the error removal.

Upon detection of an error, the printing executing unit 140 pauses a print job in execution. Upon detection of removal of an error, the printing executing unit 140 controls execution of the print job according to the transition of screens which is carried out by the display controller 130. That is, when a screen in the first mode is displayed, the printing executing unit 140 resumes the paused print job. When a screen in the second mode is displayed, the printing executing unit 140 continues the pausing.

The foregoing description of the configuration of the printing apparatus 100 has described the essential components that are needed to describe the features of the invention, and the foregoing configuration is not restrictive. Further, the configuration shall not exclude other components equipped in an ordinary printer. In addition, the printing apparatus 100 may be any apparatus having a printing capability, such as a multifunctional machine, a copy machine, or a facsimile machine.

The information processing apparatus 200 serves as the host computer of the printing apparatus 100. As illustrated, the network 50 is connected with a plurality of information processing apparatuses 200. Each information processing apparatus 200 can independently transmit a print job to the printing apparatus 100.

The information processing apparatus 200 is an ordinary printer including, for example, a CPU, a main storage unit such as RAM, an auxiliary storage unit such as ROM or hard disk, an output unit including a display, an input unit including a keyboard and a mouse, and a communication interface that interfaces transmission and reception of data to and from the printing apparatus 100.

The foregoing description of the configuration of the information processing apparatus 200 has described the essential components that are needed to describe the features of the invention, and the foregoing configuration is not restrictive. Further, the configuration shall not exclude other components equipped in an ordinary computer. In addition, the information processing apparatus 200 may be a portable terminal or the like as long as it serves as the host computer of the printing apparatus 100.

The printing system 10 to which the embodiment is adapted has the foregoing configuration. It is to be noted however that the foregoing description of the configuration of the printing system 10 has described the essential components that are needed to describe the features of the invention, and the foregoing configuration is not restrictive. Moreover, the configuration shall not exclude addition of other components.

The individual functional structures of the printing apparatus 100 are classified according to the main processing contents for ease of understanding the configuration of the printing apparatus 100. The invention should not be limited by how the components are classified or the names of the components. The configuration of the printing apparatus 100 may be classified into more components according to the contents of the processing. Further, the classification may be carried out in such a way that a single component can execute more processes than have been mentioned above. Furthermore, the processing of each component may be carried out by a single piece of hardware or plural pieces of hardware.

Next, the characterizing operation of the printing apparatus 100 with the foregoing configuration will be described.

Figure 3:
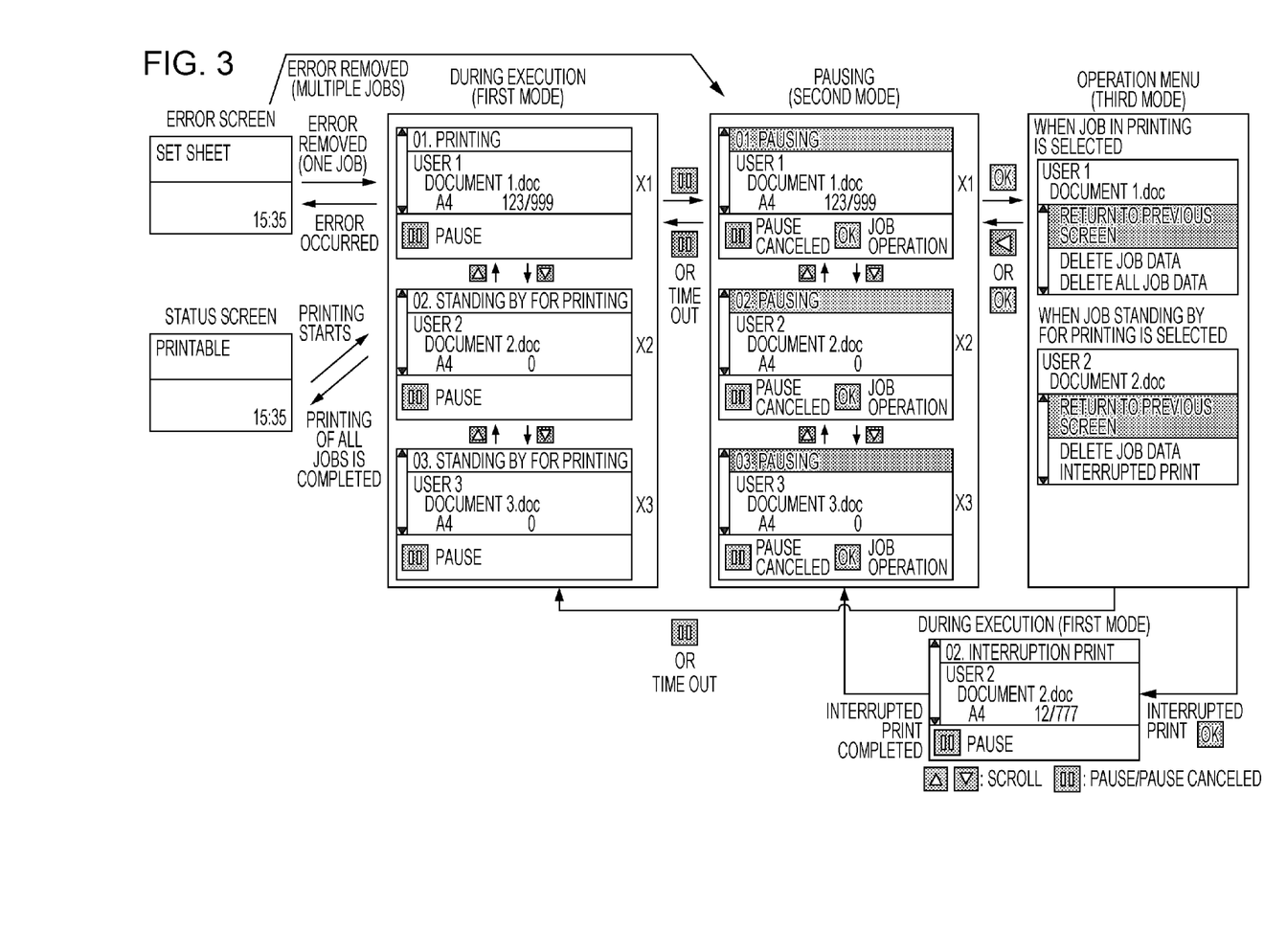
FIG. 3 is a diagram showing one example of transition of screens displayed on the operation panel.

FIG. 3 is a diagram showing one example of transition of screens displayed on the operation panel.
Status Screen The display controller 130 displays a status screen, as illustrated, on the display 126 while standing by for transmission of a print job from the information processing apparatus 200. The status screen includes a message which, for example, notifies the user that the printing apparatus 100 is in a printable state (e.g., "Printable"), and a present time.

Upon reception of a print job transmitted from the information processing apparatus 200, the print job receiver 110 stores the received print job into a predetermined storage unit, and notifies all the functional sections (120 to 140) of this event.

At this time, the print job manager 120 analyzes the print job received by the print job receiver 110, and generates information X on the print job.

The print job manager 120 decides the execution order of the print job received by the print job receiver 110. When there is no further print job in execution (or print job standing by), for example, the print job manager 120 treats the print job received by the print job receiver 110 as a first print job to be executed. When there is some further print job in execution (or print job standing by), on the other hand, the print job manager 120 treats the print job received by the print job receiver 110 as a last print job to be executed. The print job manager 120 increments the execution order of each standing-by print job by "1" (i.e., "(current execution order)−1") every time printing of a single print job is completed.

The printing executing unit 140 starts executing the print job decided as the first print job to be executed. Specifically, the printing executing unit 140 extracts a print command and data to be printed from the print job decided as the first print job to be executed to generate print data printable by the printing engine. Then, the printing executing unit 140 sends the print data to the printing engine, and controls the printing engine and the printing head to execute printing on a print medium (e.g., printing sheet) based on the print job.
Screen In Execution When the printing executing unit 140 starts executing the print job, the display controller 130 displays a screen in execution, as illustrated, on the display 126 (the above-described first mode).

A screen in execution includes, for example, information X generated by the print job manager 120. In the illustrated example, as information X1 on the print job in execution, a message "01. printing" indicating that printing is in progress, the name of a user "user 1" who has generated the print job, a file name "document 1.doc" identifying the print job, a designated sheet size "A4", the number of prints "999", etc. are displayed on the display 126.

When there is any print job standing by for printing (there are two standing-by print jobs in the illustrated example) in addition to the print job in execution, the display controller 130 displays information X on each print job in a scrollable manner.

When the DOWN key 124b is depressed with the information X1 on the print job in execution being displayed, for example, the display controller 130 changes the screen (scrolls the screen downward) to a screen displaying information X2 on a standing-by print job. In the illustrated example, as the information X2 on the standing-by print job, a message "02. standing by for printing" indicating that the print job is standing by for printing, the name of a user "user 2" who has generated the print job, a file name "document 2.doc" identifying the print job, a designated sheet size "A4", etc. are displayed on the display 126.

When the DOWN key 124b is further depressed with the information X2 on the standing-by print job being displayed, the display controller 130 changes the screen (scrolls the screen downward) to a screen displaying information X3 on another standing-by print job. In the illustrated example, as the information X3 on the standing-by print job, a message "03. standing by for printing" indicating that the print job is standing by for printing, the name of a user "user 3" who has generated the print job, a file name "document 3.doc" identifying the print job, a designated sheet size "A4", etc. are displayed on the display 126.

When the UP key 124a is depressed with the information (X2, X3) on the standing-by print job being displayed, the display controller 130 returns the screen (scrolls the screen upward) to the screen before the transition (X1, X2).

Displaying such a screen in execution (i.e., displaying information X on a print job in the first mode) allows the printing apparatus 100 according to the embodiment to accept selection of a print job in execution or a print job standing by for printing without pausing the print job in execution. The selection of a print job can be achieved by depression of the pause button 123 or the OK button 125.

Because information X on individual print jobs are displayed on the screen in execution in a scrollable manner, the information X on the individual print jobs can be displayed on the entire screen of the display 126, so that detailed information on the individual print jobs can be displayed on the display 126 accordingly. As a result, the user can surely select a print job to be paused or the like.

When printing of every print job is completed with the information X on the print jobs being displayed in the first mode (with the screen in execution being displayed), the display controller 130 returns the display screen to the status screen.

Pause Screen

When the pause button 123 is depressed with the information on the print job (any one of X1 to X3) being displayed in the first mode (screen in execution), the display controller 130 regards the event as selection of a currently-displayed print job, and displays a pause screen, as illustrated, on the display 126 (the above-described second mode).

Then, the printing executing unit 140 pauses the execution of the print job in execution.

When the screen in execution (or operation menu screen) is shifted to display the pause screen, the display controller 130 starts measuring a predetermined long time (e.g., 60 seconds) using a timer. Every time the user performs some kind of operation, such as scrolling, while the pause screen is displayed, the display controller 130 starts measuring the predetermined long time from the beginning.

When the screen is shifted from an error screen to display the pause screen, the display controller 130 starts measuring a predetermined short time (e.g., 10 seconds) shorten than the predetermined long time instead of this predetermined long time using the timer. Once the user performs some kind of operation, such as scrolling, while the pause screen is displayed, however, the display controller 130 uses the predetermined long time thereafter.

The pause screen includes information X generated by the print job manager 120. For example, the display controller 130 displays the information on the print job selected on the screen in execution (any one of X1 to X3) on the pause screen too.

It is to be noted however that the display of the pause screen (second mode) differs from the display of the screen in execution (first mode) in that the message "01. pausing" indicating that the print job is paused is highlighted.

When there is any print job standing by for printing (there are two standing-by print jobs in the illustrated example) as in the display of the screen in execution (first mode), the display controller 130 displays information X on each of the paused print job and the standing-by print job print in a scrollable manner.

Displaying such a pause screen (i.e., displaying information X on a print job in the second mode), with a print job in execution being paused, the printing apparatus 100 according to the embodiment to accept selection of the paused print job or a print job standing by for printing. The selection of a print job can be achieved by depression of the OK button 125.

When the pause button 123 is depressed with the information X on the print job being displayed in the second mode (with the pause screen displayed), the display controller 130 regards the event as cancellation of pausing, and returns the display screen to the screen in execution (first mode). Accordingly, the printing executing unit 140 resumes the execution of the paused print job.

When the predetermined long time or the predetermined short time elapses without the user's performing any operation with the pause screen being displayed, the display controller 130 returns the display screen to the screen in execution. Accordingly, the printing executing unit 140 resumes the execution of the paused print job.

Operation Menu Screen

When the OK button 125 is depressed with the information on the print job (any one of X1 to X3) being displayed in the second mode (pause screen), the display controller 130 regards the event as selection of a currently-displayed print job, and displays a pause screen, as illustrated, on the display 126 (the above-described third mode).

When the operation menu screen is displayed, the display controller 130 starts measuring a predetermined long time using the timer. Every time the user performs some kind of operation, such as scrolling, while the operation menu screen is displayed, the display controller 130 starts measuring the predetermined long time from the beginning.

The operation menu screen includes, for example, operation items to be executed for the print job selected on the pause screen (or screen in execution) in addition to the information X on the print job generated by the print job manager 120.

When the paused print job is selected on the pause screen, for example, as illustrated, the display controller 130 displays the name of the user "user 1" who has generated the print job, and the file name "document 1.doc" identifying the print job, and displays "return to previous screen", "delete job data", "delete all job data", etc. as the operation items to be executed for the selected print job.

When the standing-by print job is selected on the pause screen, for example, on the other hand, the display controller 130 displays the name of the user "user 2" who has generated the print job, and the file name "document 2.doc" identifying the print job, and displays "return to previous screen", "delete job data", "interruption print", etc. as the operation items to be executed for the selected print job.

When "return to previous screen" is selected (or when the LEFT key 124c is depressed), the display controller 130 returns the display screen to the pause screen (second mode).

When "delete job data" is selected, the display controller 130 deletes the print job selected on the pause screen, and returns the display screen to the screen in execution (first mode). It is to be noted however that when there is no further print job to be executed, the display controller 130 returns the display screen to the status screen.

When "delete all job data" is selected, the display controller 130 deletes the print job selected on the pause screen and all other print jobs, and returns the display screen to the status screen.

When the pause button 123 is depressed, the display controller 130 regards this event as an instruction to cancel pausing, and returns the display screen to the screen in execution (first mode). Accordingly, the printing executing unit 140 resumes the execution of the paused print job.

When the predetermined long time elapses without the user's performing any operation with the operation menu screen being displayed, the display controller 130 returns the display screen to the screen in execution. Accordingly, the printing executing unit 140 resumes the execution of the paused print job.

Screen In Execution (Interruption Print)

When "interruption print" is selected on the operation menu screen, the display controller 130 returns the display screen to the screen in execution (first mode), and displays information X on a print job whose interruption print is instructed on the display 126. The printing executing unit 140 executes the print job whose interruption print is instructed by priority (what is called "interruption print"). When there is a paused print job at this time, the printing executing unit 140 interrupts the execution of this print job. The print job manager 120 decrements the execution order of each of other print jobs than the print job to be executed by priority by "1" (i.e., "(current execution order)+1").

Even when "interruption print" is selected on the operation menu screen and the display screen is shifted to the screen in execution, the display controller 130 displays information X on each print job in a scrollable manner when there is a standing-by print job. Further, depression of the pause button 123 can cause the display screen to be shifted to a pause screen, or to be returned to the screen in execution from the pause screen.

When printing by the printing executing unit 140 is completed with information X on an interruption print job being displayed in the first mode (screen in execution), the display controller 130 returns the display screen to the pause screen.

Error Screen

When the display controller 130 is notified of the detection of an error by the printing executing unit 140 with information X on a print job being displayed in the first mode (with the screen in execution being displayed), the display controller 130 displays an error screen, as illustrated, on the display 126. The error screen includes, for example, a message notifying the user of an error occurring in the printing apparatus 100 (e.g., "set sheet"). The printing executing unit 140 pauses the print job in execution in response to the detection of the error.

When the display controller 130 is notified of removal of the error by the printing executing unit 140, the display controller 130 determines whether the number of print jobs to be managed by the print job manager 120 is one, or more than one.

When there is one print job to be managed by the print job manager 120, e.g., when there is no standing-by print job but a paused print job, the display controller 130 returns the display screen to the screen in execution. Accordingly, the printing executing unit 140 resumes the execution of the print job paused by the error.

When there are more than one print job to be managed by the print job manager 120, e.g., when there are a print job paused by the error and at least one print job standing by for printing, the display controller 130 displays the pause screen (second mode). In this case, the printing executing unit 140 continues the paused print job.

The structure of each screen according to the embodiment of the invention is just an example, and may be changed as needed without departing from the scope of the invention.

The foregoing is the description of one embodiment of the invention which improves the usability of interruption print of a print job at the time of removing an error.

That is, according to the embodiment, when an error is removed, the printing apparatus shifts the display screen to a pause screen without automatically resuming a paused print job. The user can select a print job standing by for printing other than the paused print job on the pause screen, and instruct interruption print on the operation menu screen which is shifted from the pause screen.

This configuration prevents a paused print job from being automatically resumed by cancellation of the error, so that the user can proceed to the operation for interruption print without depressing the pause key. This allows interruption print of a print job with fewer operations at the time of removing an error, thus providing improved usability. Particularly, it is convenient for a user standing in front of the printing apparatus to remove an error because the printing result of the user's own print job can be output first.

According to the embodiment, when a print job is paused in order to remove an error, the printing apparatus measures a time-out time (predetermined short time) shorter than the normal time-out time (predetermined long time). When the time-out time elapses, the printing apparatus shifts the display screen to the screen in execution.

With the above configuration, even when the user does not perform any operation during pausing after removal of an error, printing is resumed more quickly. When the user who has removed an error is the user for the paused print job, for example, this user need not perform any operation, so that printing is resumed quickly, which is convenient for the user.

The foregoing embodiment is intended to exemplify the subject matter of the invention, and does not restrict the invention. It would be apparent for those skilled in the art to come up with many substitutes, changes and modifications.

Modifications

Figure 4:
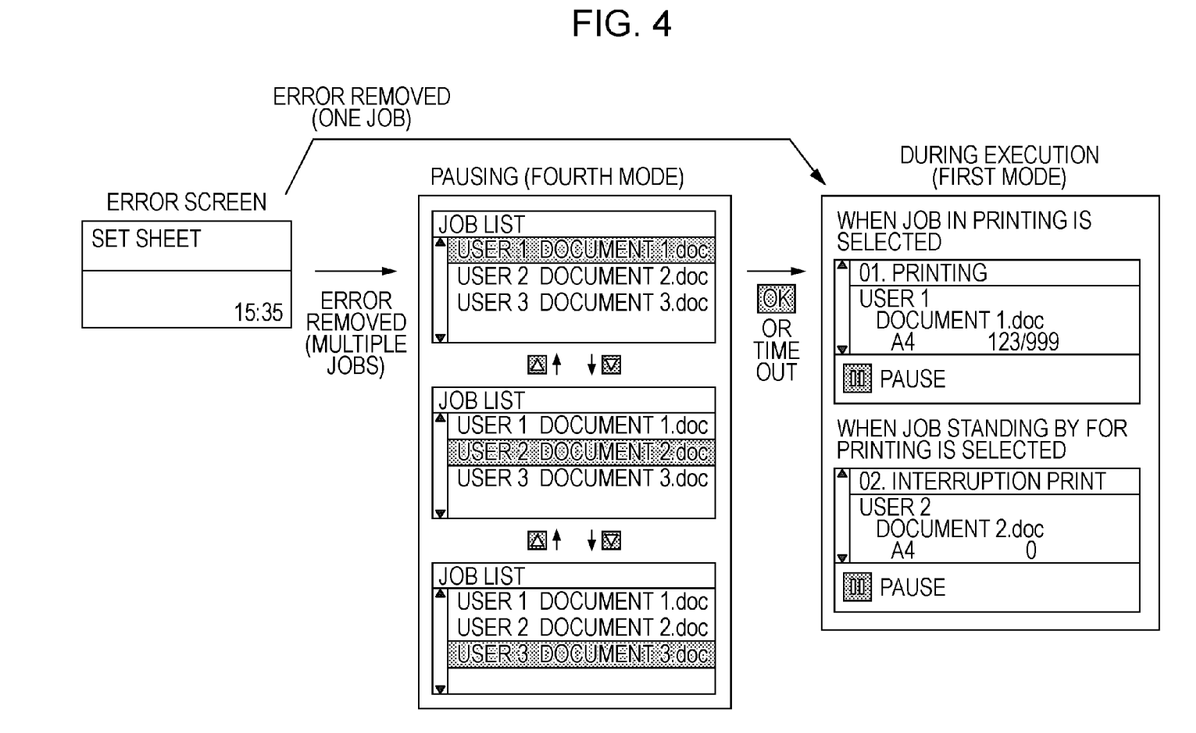
FIG. 4 is a diagram showing a modification of transition of screens displayed on the operation panel.

FIG. 4 is a diagram showing a modification of transition of screens displayed on the operation panel. The illustration of FIG. 4 focuses on the differences from the illustration of FIG. 3. The following descriptions centers around the differences from the illustration of FIG. 3.

When the display controller 130 is notified of removal of an error by the printing executing unit 140 with the error screen being displayed, the display controller 130 determines whether the number of print jobs to be managed by the print job manager 120 is one, or more than one.

When there is one print job to be managed by the print job manager 120, the display controller 130 returns the display screen to the screen in execution. Accordingly, the printing executing unit 140 resumes the execution of the print job paused by the error.

When there are more than one print job to be managed by the print job manager 120, the display controller 130 displays the pause screen (fourth mode), as illustrated, on the display 126. In this case, the printing executing unit 140 continues to pause the print job.

A list of the paused print job and print jobs standing by for printing is displayed on the pause screen (fourth mode). For example, FIG. 4 illustrates information on three print jobs in the execution order ("user 1 document 1.doc", "user 2 document 2.doc", "user 3 document 3.doc"). Each printing displayed on the pause screen (fourth mode) may be selected by operating the directional keys. In FIG. 4, information on the selected print job is highlighted.

When the screen is shifted from the error screen to display the pause screen (fourth mode), the display controller 130 starts measuring the predetermined short time (e.g., 10 seconds) using the timer. Once the user performs some kind of operation, such as scrolling, while the pause screen is displayed, however, the display controller 130 uses the predetermined long time thereafter.

When the OK button 125 is depressed with the pause screen (fourth mode) being displayed, the display controller 130 returns the display screen to the screen in execution (first mode), and displays information X on a print job selected on the pause screen on the display 126. When a print job standing by for printing is selected, the display controller 130 considers that interruption print is instructed, and displays information X on this print job.

When the print job paused by the error is selected, the printing executing unit 140 resumes the execution of the paused print job. When a standing-by print job is selected, on the other hand, the printing executing unit 140 executes the print job whose interruption print is instructed by priority.

When the predetermined long time or the predetermined short time elapses without the user's performing any operation with the pause screen (fourth mode) being displayed, the display controller 130 returns the display screen to the screen in execution. Accordingly, the printing executing unit 140 resumes the execution of the print job paused by the error.

The modification of one embodiment of the invention also improves the usability of interruption print of a print job at the time of removing an error.

That is, according to the modification, when an error is removed, the printing apparatus shifts the display screen to a pause screen without automatically resuming a paused print job. The user can select a print job to be executed from the paused print job and the standing-by print job, and start executing the selected print job.

This configuration allows interruption print of a print job with fewer operations at the time of removing an error, thus improving the usability.

Other Modifications

According to the embodiment and the foregoing modification thereof, the user can instruct interruption print by operating the operation panel after removal of an error. However, interruption print may be instructed without operating the operation panel.

For example, the printing apparatus may include a readout unit that reads out information stored on a storage medium from a card having the storage medium. Each user holds a card where the user's own user ID (e.g., the name of an apparatus that generates a print job or the name of the user) is stored. The printing apparatus has a function of acquiring the user ID from the user's card by means of the readout unit, and inquiring, for example, a verification server connected to the printing apparatus over a network about the user ID to verify the user. The printing apparatus may itself have a function of verifying the user ID without accessing such a verification server. The user mounts the card on the readout unit or sets the card close to the readout unit during pausing after removal of an error in the printing apparatus. As a result, the printing apparatus reads the user ID from the user's card and verifies the user ID. When the user ID is verified, the printing apparatus selects a print job corresponding to the user ID, and performs printing by priority.

The above configuration allows interruption print of a print job without the user's operating the operation panel, thus improving the usability.

The entire disclosure of Japanese Patent Application No. 2011-141809, filed Jun. 27, 2011 is expressly incorporated by reference herein.

What is claimed is:

1. A printing apparatus comprising:
  a printing unit that executes printing based on a print job; and
  a detector that detects occurrence and removal of an error in the printing apparatus,
  whereby when removal of an error is detected, the printing unit continues a paused state of the print job paused by the error,
  wherein with removal of an error being detected, the printing unit continues the paused state of the paused print job when there is another print job standing by for printing in addition to the print job paused, and resumes execution of the paused print job when there is not any print job standing by for printing.

2. The printing apparatus according to claim 1, further comprising an instruction unit that accepts an instruction from a user,
  wherein when removal of an error is detected, the printing unit executes printing based on one of the paused print job, and the another print job standing by for printing which is selected by via the instruction unit.

3. The printing apparatus according to claim 2, further comprising a display unit that displays information on the paused print job,
  wherein when removal of an error is detected, the display unit displays information on the paused print job and information on the another print job standing by for printing on a pause screen in a switchable manner via the instruction unit, and accepts selection of one of the print jobs.

4. The printing apparatus according to claim 2, further comprising a display unit that displays information on the paused print job,
  wherein when removal of an error is detected, the display unit displays a list of information on the paused print job and information on the another print job standing by for printing on a pause screen, and accepts selection of one of the print jobs.

5. The printing apparatus according to claim 2, wherein after removal of an error is detected, the printing unit starts measuring a first predetermined time, and when the first predetermined time elapses without an instruction from the user, the printing unit resumes execution of the paused print job.

6. The printing apparatus according to claim 5, wherein when there is a predetermined instruction from the user before elapse of the first predetermined time, the printing unit starts measuring a second predetermined time longer than the first predetermined time, and when the second predetermined time elapses without an instruction from the user, the printing unit resumes execution of the paused print job.

7. The printing apparatus according to claim 2, further comprising a verification unit that verifies the user,
  wherein the printing unit selects one of the paused print job, and the another print job standing by for printing whose user is verified by the verification unit, and executes printing based on the selected print job.

8. A printing method for a printing apparatus, comprising:
  executing printing based on a print job; and
  detecting occurrence and removal of an error in the printing apparatus,
  whereby when removal of an error is detected, a paused state of the print job paused by the error is continued in the execution of printing,
  wherein with removal of an error being detected, the printing unit continues the paused state of the paused print job when there is another print job standing by for printing in addition to the print job paused, and resumes execution of the paused print job when there is not any print job standing by for printing.

9. A printing method for a printing apparatus, comprising:
  executing printing based on a print job;
  pausing the execution of printing based on a user instruction; and
  detecting occurrence and removal of an error in the printing apparatus,
  wherein when occurrence of an error is detected, pausing the execution of the printing, and
  wherein when removal of an error is detected, a paused state of the print job paused by the error is removed, whereas a paused state caused by the user instruction is continued.

10. A printing apparatus comprising:
  a printing unit that executes printing based on a print job;
  a control unit that pause an execution of the print job by a user instruction; and a detector that detects occurrence and removal of an error in the printing apparatus, wherein when occurrence of an error is detected, the printing unit pauses an execution of the print job, and wherein when removal of an error is detected, the printing unit removes a paused state of the print job paused by the error and continues a paused state of the print job paused by the user instruction.

* * * * *